(12) United States Patent
Vitel et al.

(10) Patent No.: US 6,533,332 B2
(45) Date of Patent: Mar. 18, 2003

(54) COUPLING FOR CONNECTING A TUBULAR FITTING TO A PIPE

(75) Inventors: Jean-Pierre Vitel, Thiaucourt-Regnieville (FR); Noël Favier, Dieulouard (FR); Didier Lescot, Toul (FR); Philippe Renard, Fleville (FR)

(73) Assignee: Saint-Gobain Pam, Nancy (FR)

( * ) Notice: Subject to any disclaimer, the term of this patent is extended or adjusted under 35 U.S.C. 154(b) by 0 days.

(21) Appl. No.: 10/110,327
(22) PCT Filed: Jul. 17, 2001
(86) PCT No.: PCT/FR01/02326
§ 371 (c)(1), (2), (4) Date: Apr. 11, 2002
(87) PCT Pub. No.: WO02/16815
PCT Pub. Date: Feb. 8, 2002

(65) Prior Publication Data
US 2002/0163195 A1 Nov. 7, 2002

(30) Foreign Application Priority Data
Aug. 25, 2000 (FR) .............................................. 00 10964

(51) Int. Cl.[7] ................................................ F16L 35/00
(52) U.S. Cl. ......................... 285/337; 285/23; 285/321; 285/374
(58) Field of Search .......................... 285/23, 321, 337, 285/374

(56) References Cited

U.S. PATENT DOCUMENTS

| 3,698,744 | A | * | 10/1972 | Bevington | ................... | 285/111 |
| 4,127,290 | A | * | 11/1978 | Mutschlechner | ............ | 285/343 |
| 4,417,754 | A | * | 11/1983 | Yamaji et al. | .............. | 285/104 |
| 4,456,288 | A | * | 6/1984 | Conner | ........................ | 285/321 |
| 4,648,633 | A | * | 3/1987 | Bergmann | .................. | 285/337 |
| 4,867,488 | A | * | 9/1989 | Jones | ......................... | 285/328 |
| 5,833,277 | A | * | 11/1998 | Reinert et al. | ................ | 285/39 |
| 6,062,611 | A | * | 5/2000 | Percebois et al. | ........... | 285/374 |
| 6,179,346 | B1 | * | 1/2001 | Robson | ...................... | 285/314 |

FOREIGN PATENT DOCUMENTS

EP         0899495 A2 *  3/1999

* cited by examiner

*Primary Examiner*—Lynne H. Browne
*Assistant Examiner*—James M. Hewitt
(74) *Attorney, Agent, or Firm*—Sughrue Mion, PLLC

(57) ABSTRACT

The coupling includes a peripheral locking gasket for the pipe, the gasket being elastically deformable from a state in which it has a nominal inside diameter; an outer clamping ring placed on the end of the pipework element and surrounding the gasket; and a mechanism for thrusting the clamping ring axially towards the pipework element. The coupling has a spacer for holding the gasket spaced apart with an inside diameter greater than its nominal diameter before the pipe is put into place, the spacer being releasable once the pipe is in place.

12 Claims, 4 Drawing Sheets

COUPLING FOR CONNECTING A TUBULAR FITTING TO A PIPE

The present invention relates to a coupling for connecting a tubular pipework element with a pipe of plastics material engaged in said pipework element, the coupling being of the type comprising:

a peripheral locking gasket for the pipe, which gasket is adapted to extend around the pipe and is elastically deformable radially from a rest state in which it has a nominal inside diameter;

an outer clamping ring placed on the end of the pipework element and surrounding the peripheral gasket; and axial thrust means for thrusting the clamping ring axially towards the pipework element, the facing surfaces of the clamping ring and of the gasket presenting associated cam surfaces adapted to compress the gasket centripetally onto the pipe when the clamping ring is thrust axially towards the pipework element.

BACKGROUND OF THE INVENTION

The pipework elements in question can be pipes proper, flanged junction elements, or indeed piping accessories such as pipe fittings.

Such a coupling is intended in particular for connecting a tubular pipework element made of cast iron or of any other metal with a pipe having a smooth outside surface, and more particularly with a pipe made of plastics material such as polyvinyl chloride (PVC), polyethylene, or polypropylene, or with a pipe made of some other material.

In addition to providing sealing, such a connection coupling also serves to lock the pipe axially relative to the tubular pipework element, i.e. it prevents the two elements from moving axially relative to each other.

Such locking is provided by centripetal pressure being applied onto the peripheral gasket while the outer clamping ring is being subjected to axial thrust.

By way of example, such a coupling is described in document DE 30 02 205. In that document, the peripheral gasket is formed by a resilient split ring covered on its inside surface with hard engagement particles. Prior to assembly, the ring is engaged around the pipe and is held lengthwise thereon by means of its own resilience pressing the inside surface of the gasket against the outside surface of the pipe. To achieve locking proper, an outer clamping ring is screwed onto the tubular pipework element.

With a coupling as described in that document, it is necessary to position the locking gasket properly on the pipe before the pipe is engaged in the pipework element. The gasket must be positioned in the location that it is to occupy when it is finally installed on the pipe. Such positioning is relatively difficult to achieve since, prior to placing the pipe in the pipework element, it is difficult to foresee the exact position that the pipe will occupy within the pipework element.

OBJECTS AND SUMMARY OF THE INVENTION

An object of the invention is to propose a connection coupling enabling a pipe to be coupled to a tubular pipework element while accommodating great latitude in their relative axial positioning.

To this end, the invention provides a coupling of the above-specified type for connecting a tubular pipework element with a pipe engaged in the pipework element, the coupling including spacer means for holding the gasket spaced apart with an inside diameter greater than its nominal diameter prior to the pipe being put into place, which spacer means are releasable once the pipe is in place.

In particular elements, the coupling includes one or more of the following characteristics:

the gasket has at least one gap in its circumference, and the said spacer means include a removable spacer located initially in the gap, which spacer includes a handle extension that is accessible from outside the clamping ring;

around its circumference the gasket has at least two jaws that are curved and rigid, together with elastic return means for thrusting the two jaws centripetally;

the clamping ring has a notch in its inside surface for passing the handle extension of said spacer;

between the locking gasket and the end of the pipework element, the coupling includes resilient thrust means for thrusting the gasket axially away from the end of the pipework element;

the resilient thrust means comprise a washer that is axially expandable, at least in part;

the clamping ring has an inside groove for receiving the outside edge of said washer that is axially expandable, at least in part;

the pipework element has an internal peripheral groove and a sealing gasket disposed in the internal peripheral groove;

the axial thrust means include complementary thread elements formed on the clamping ring and on the pipework element;

the associated cam surfaces formed on the clamping ring and the gasket are frustoconical surfaces;

the clamping ring has a radial hole for receiving a pin for locking the clamping ring relative to the tubular pipework element, said hole being formed through the clamping ring so that when the clamping ring is placed on the end of the pipework element and is subjected to thrust from the axial thrust means the hole opens out along a locking abutment for the pin formed at the surface of the pipework element; and the coupling includes a pin connected to said spacer.

The invention also provides a method of connecting a tubular pipework element with a pipe engaged in the pipework element, using a coupling comprising:

a peripheral locking gasket for the pipe, which gasket is adapted to extend around the pipe and is elastically deformable radially from a rest state in which it presents a nominal inside diameter that is smaller than the outside diameter of the pipe;

an outer clamping ring placed on the end of the pipework element and surrounding the peripheral gasket; and axial thrust means for thrusting the clamping ring axially towards the pipework element, the facing surfaces of the clamping ring and of the gasket presenting associated cam surfaces adapted to compress the gasket centripetally against the pipe when the clamping ring is thrust axially towards the pipework element;

the method comprising the following successive steps:
holding said gasket spaced apart with a diameter greater than the outside diameter of the pipe, said gasket being in place axially in the coupling;
inserting the pipe into said gasket;
releasing said gasket so that it presses elastically around the pipe; and thrusting the clamping ring axially towards the pipework element.

BRIEF DESCRIPTION OF THE DRAWINGS

The invention will be better understood on reading the following description given purely by way of example and made with reference to the drawings, in which.

MORE DETAILED DESCRIPTION

Figure 1:
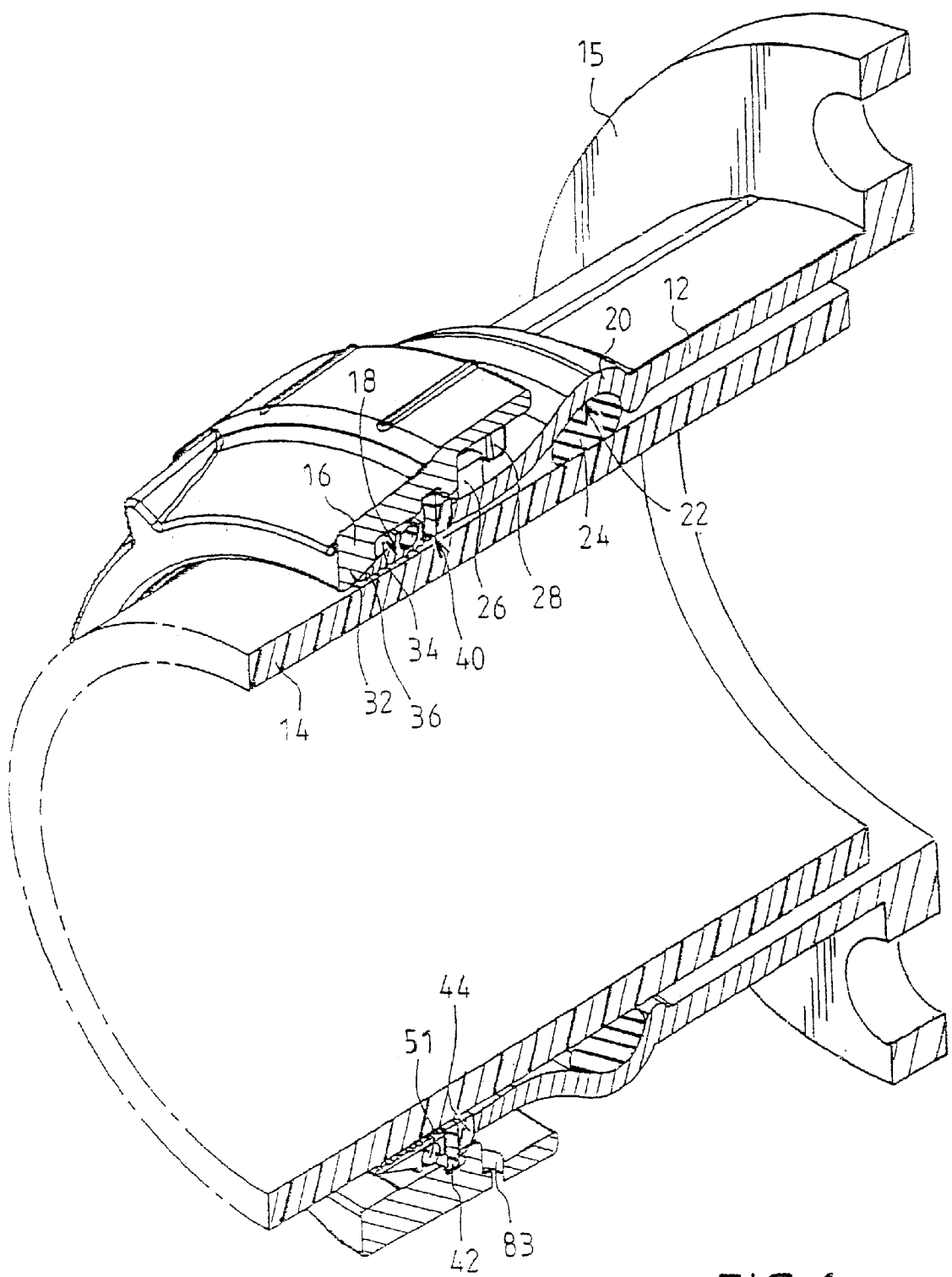
FIG. 1 is a view in perspective and in longitudinal section showing a connection coupling of the invention, after locking has been performed.

The coupling 10 shown in the figures is adapted to making a connection between a tubular pipework element 12 and a pipe 14. It is particularly suitable for interconnecting elements that are made of different materials, and in particular a tubular pipework element made of cast iron or any other metal, and a pipe made of plastics material such as polyvinyl chloride (PVC), polyethylene, or polypropylene, or indeed a pipe made of any other material.

By way of example, the pipework element 12 constitutes a coupling element serving at one end to connect with the pipe 14 via the coupling of the invention, and provided at its other end, for example, with a flange 15 or with any other element suitable for connecting the coupling element with a pipe made of the same material. A flange coupling of any conventional type is then used between the pipework element 12 and the adjacent pipe.

The pipework element 12 is designed to receive the end of the pipe 14 internally. Thus, it has an inside diameter that is greater than the outside diameter of the pipe 14. The pipe is engaged inside the pipework element from a free end thereof.

The pipe 14 is constituted by a tube of circular section presenting an outside surface that is smooth, having no projections or indentations suitable for connection purposes. Thus, in its region for connection with the tubular pipework element 12, the pipe 14 has a smooth end.

The coupling of the invention essentially comprises a clamping ring 16 placed on the free end of the pipework element 12 and a peripheral locking gasket 18 surrounding the pipe 14. This locking gasket is compressed centripetally by the clamping ring 16 when it is thrust axially towards the pipework 12.

Behind its free end receiving the clamping ring, the side wall of the pipework element 12 has an external peripheral deformation 20 defining an internal peripheral groove 22 in which a sealing ring 24 is received that is held pressed against the outside surface of the pipe 14. The sealing ring 24 provides sealing between the pipe 14 and the pipework element 12.

On its outside surface, in the vicinity of its free end, the pipework element 12 carries studs 26 enabling the clamping ring 16 to be screwed to the end of the pipework element. These studs 26, which may be four in number, for example, are adapted to co-operate with four helical ramps 28 projecting from the inside surface of the ring 16.

The studs 26 and the ramps 28 form screw-fastening means which serve during screw-tightening to thrust the clamping ring 16 axially towards the pipework element 12.

The clamping ring 16 extends generally around the pipe 14 beyond the free end of the pipework element 12, which element is surrounded only by the segment of the clamping ring that carries the ramps 28.

The segment of the clamping ring 16 that extends beyond the pipework element presents a reentrant rim 32 with an annular chamber 34 being defined behind the rim for receiving part of the gasket 18.

A frustoconical cam surface 36 is formed at the end of the reentrant rim 32. This cam surface 36 faces towards the pipework element 12. Thus, the circumference of the end of the rim 32 is of a diameter that increases progressively going towards the pipework element 12.

The cam surface 36 is adapted to co-operate with a complementary cam surface performed on the gasket 18 and described in detail below.

In the vicinity of the end of the pipework element 12, but beyond it, the side surface defining the chamber 34 presents a peripheral groove 38 for receiving resilient means 40 for thrusting the gasket 18 axially.

The means 40 are in the form of a split washer that is resilient, at least in part. This washer presents a support ring 42 made of rigid plastics material.

The outer peripheral edge of the support ring is received in the peripheral groove 38. On its face directed towards the pipework element 12, and in the vicinity of its bottom edge, the support ring 42 carries annular packing 44 made of a resilient material such as foam or rubber. The packing is suitable for pressing against the end wall of the pipework element 12. It extends around the entire circumference of the support ring 42. The width of the peripheral groove 38 is greater than the thickness of the support ring 42, thus enabling the at least partially resilient washer to move axially.

Figure 3:
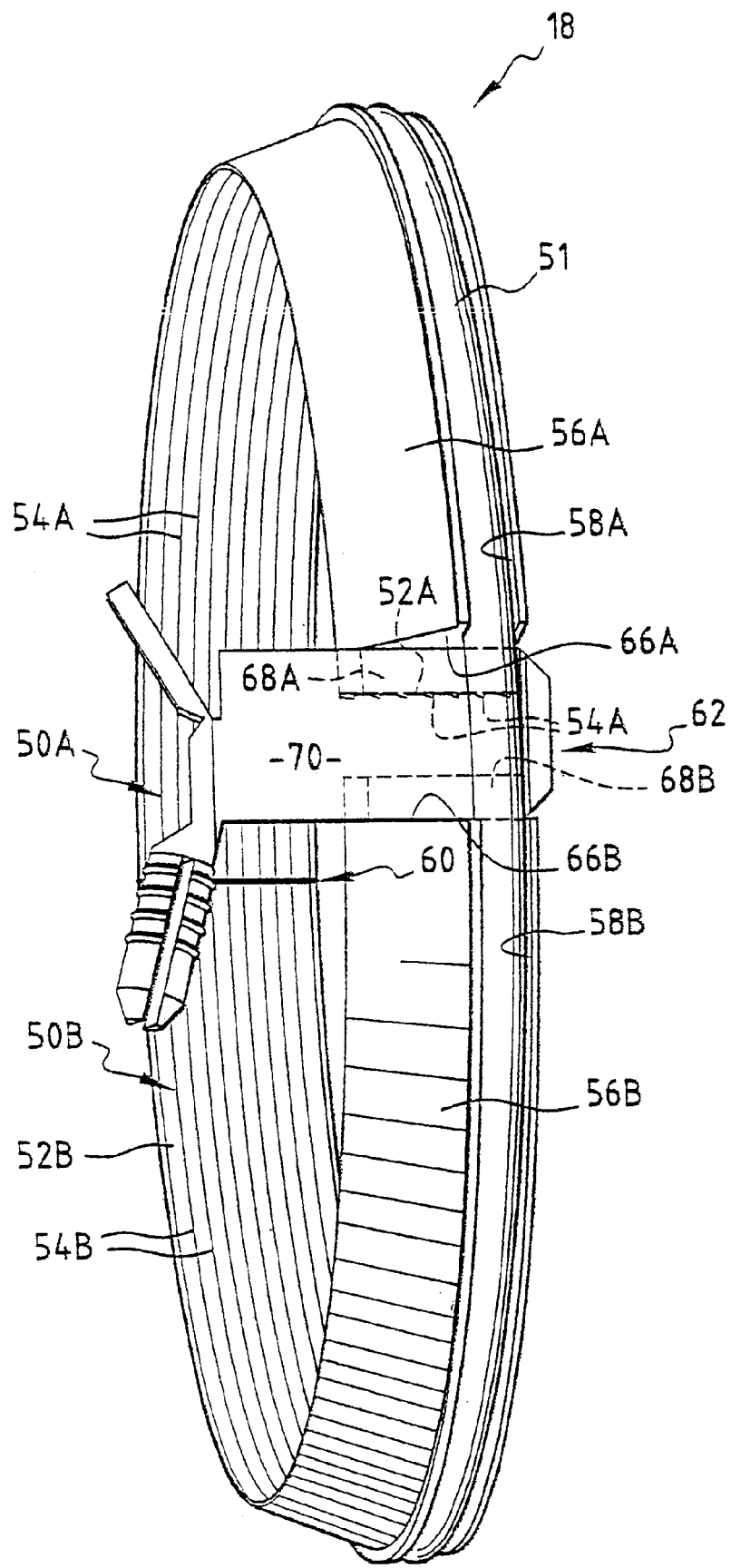
FIG. 3 is a perspective view on a larger scale showing the peripheral locking gasket of the invention, the gasket being held in a spaced-apart position.

As can be seen more clearly in FIG. 3, the locking gasket 18 has two semicylindrical jaws 50A and 50B which are associated with each other to form a hinged ring. The gasket 18 also has resilient return means constituted in the example described by a elastic band 51 passing around the coupled-together jaws 50A and 50B. Since this band 51 is pressed against the outside surfaces of the jaws it applies centripetal thrust thereto.

The jaws 50A and 50B have respective semicylindrical inside surfaces 52A and 52B. These surfaces are provided with semicylindrical engagement ribs 54A, 54B extending from end to end along each jaw.

On its outside surface, each jaw has a cam surface 56A, 56B of generally frustoconical shape and of slope that corresponds to that of the cam surface 36 formed on the rim 32 of the clamping ring.

Longitudinally behind the cam surface 56A, 56B of each jaw there is formed an outwardly open semicylindrical groove 58A, 58B within which the elastic band 51 is received. The band 51 is thus confined axially within these grooves.

First ends of the jaws are pressed into contact with each other along a line of contact 60 parallel to the axis. This contact takes place along the end edge faces of the two semicylindrical jaws. The two jaws are hinged together along said line.

The second ends of the jaws define between them a gap 62 of width that varies as a function of the spacing between the two jaws. On the outside, these second ends present respective setbacks defined in the thickness of the jaws, providing transverse shoulders 66A, 66B placed facing each other, and cylindrical bearing surfaces 68A, 68B placed in front of the shoulders.

These bearing surfaces are suitable for receiving a removable spacer 70 whose side edges bear against the shoulders 66A, 66B so as to hold the second ends of the two jaws 50A and 50B spaced apart against the action of the elastic band 51. The gasket 18 is thus maintained with an inside diameter that is greater than its nominal diameter as defined when the edges of the two jaws come into contact.

Figure 4:
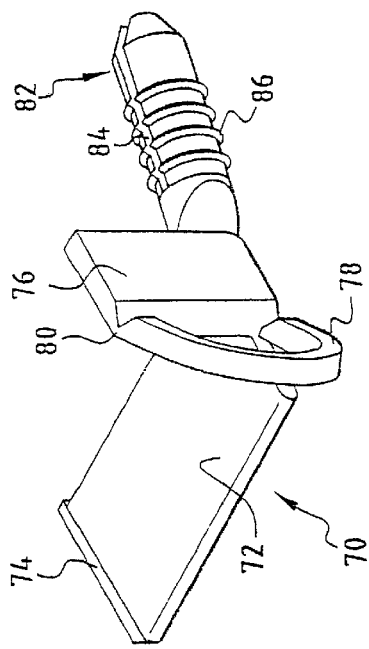
FIG. 4 is a perspective view of an accessory for a connection coupling of the invention, the accessory comprising both a spacer and a locking pin.
Figure 2:
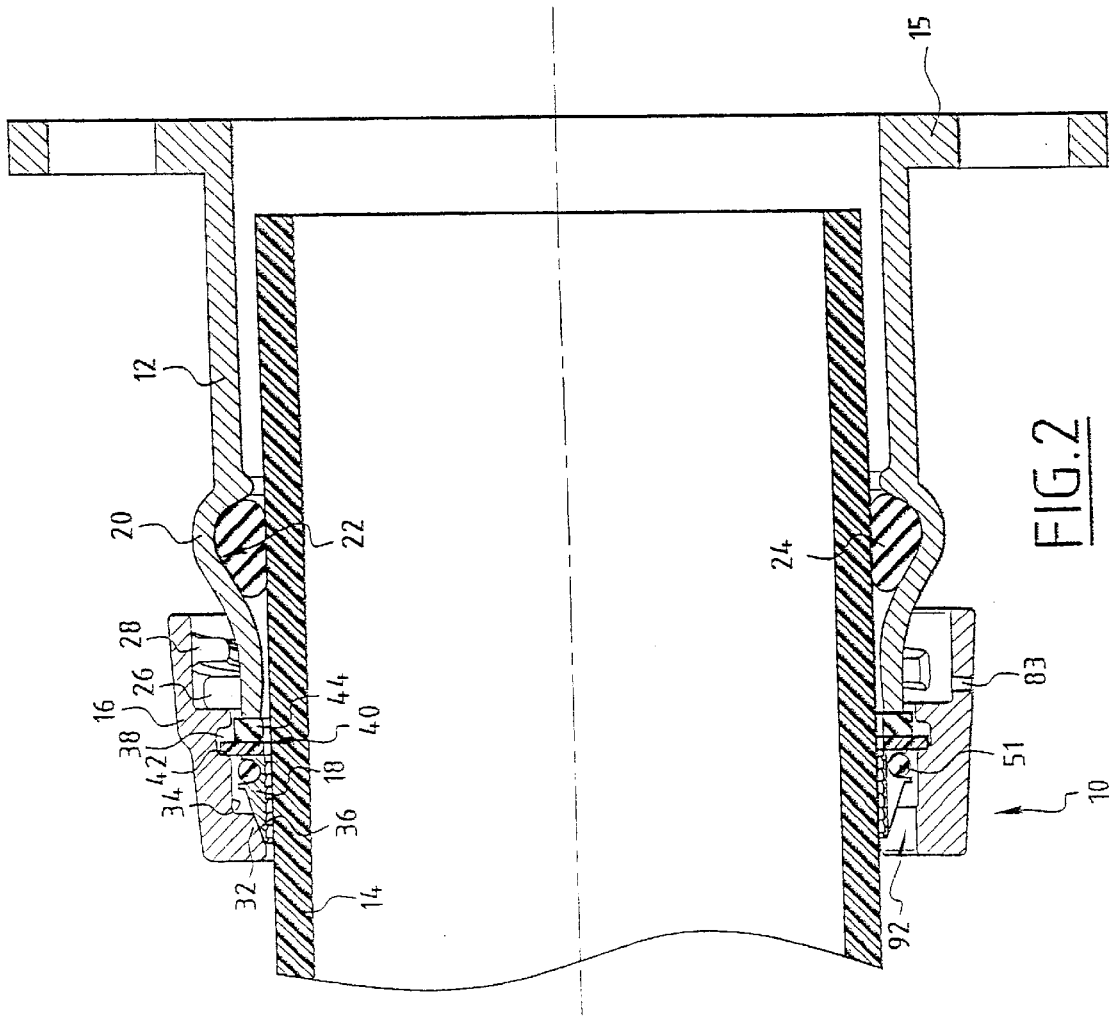
FIG. 2 is a longitudinal section view of the FIG. 1 coupling shown in the same state.

The spacer 70 is shown on a larger scale in FIG. 4. It is constituted by a rectangular plate 72 of small thickness having two parallel side edges adapted to bear against the shoulders 66A, 66B. The distance between these two side edges is greater than the sum of the widths of the bearing surfaces 68A and 68B.

At one end, the plate 72 has a rim 74 forming an abutment adapted to co-operate with the elastic band 51, this abutment forming a hard point when the elastic band 51 passes over the rim 74. At its other end, the plate 72 is formed integrally with a body 76 that is connected to a hinged pull tab 78. The tab is in the form of a semicircular loop. It is hinged to the body 76 in a narrowed region 80 that forms a hinge.

In addition, the body 76 is integral with a pin 82 adapted, once the ring 16 has been clamped, to be inserted in a radial hole 83 formed in the ring 16 in the region surrounding the pipework element. More precisely, this hole is formed close to a stud 26 when the clamping ring is screwed onto the pipework element after the coupling has been locked.

The pin 82 has a longitudinal slot 84 and peripheral ribs 86. The pin 82 is connected to the body 76 at one end.

Figure 5:
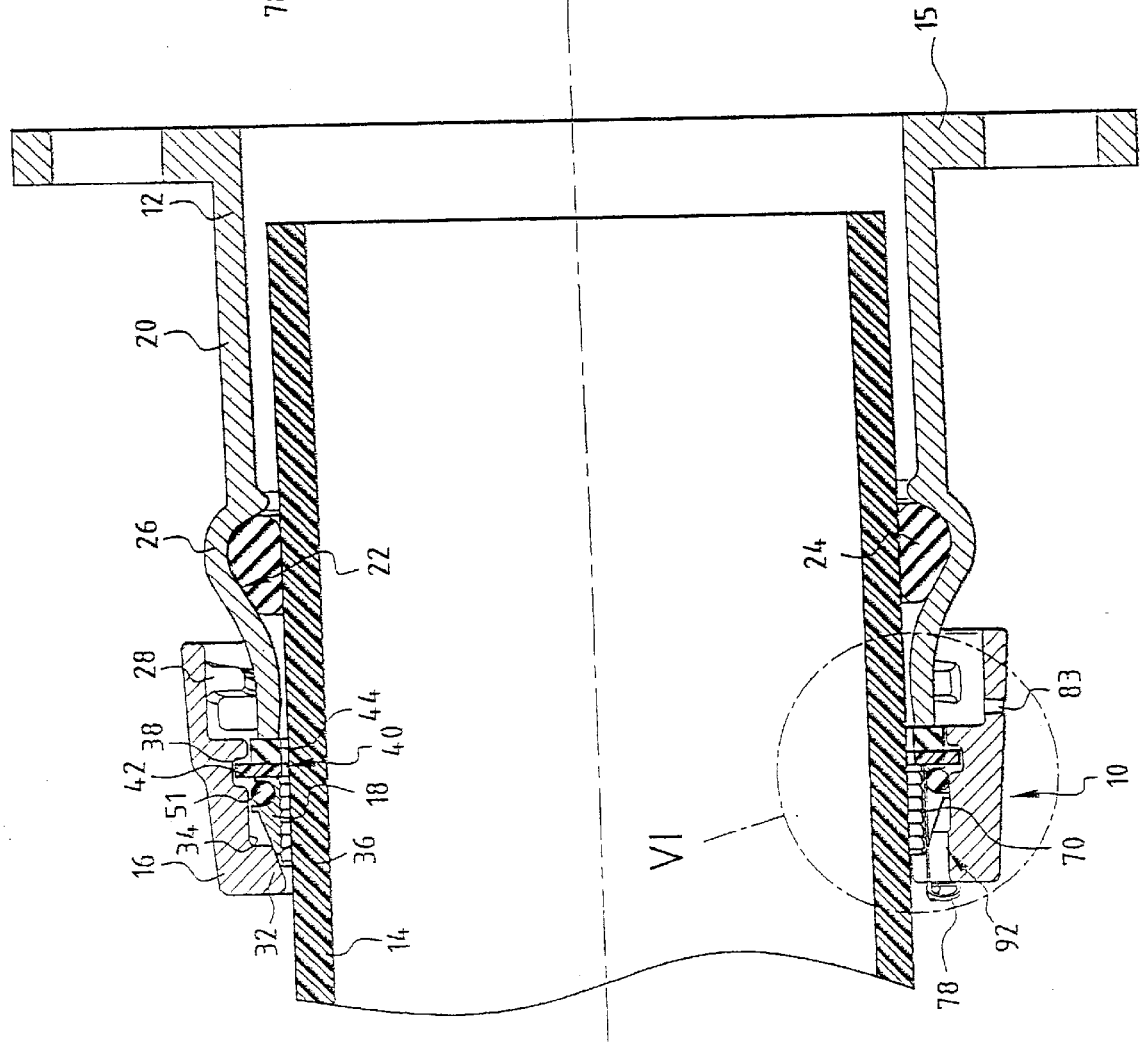
FIG. 5 is a view analogous to FIG. 2, prior to locking being established.

Initially, as shown in FIG. 5, before the connection is made, the gasket 18 is confined within the chamber 34, the ring 16 being loose but engaged around the pipework element 12.

In this position, each of the jaws of the gasket 18 is pressed against the cam surface 36 of the ring under the resilient action of the packing 44 of the ring 40.

The locking gasket 18 is held spaced apart by the presence of the spacer 70 engaged in the gap 62 defined between the two machined ends of the jaws.

Figure 6:
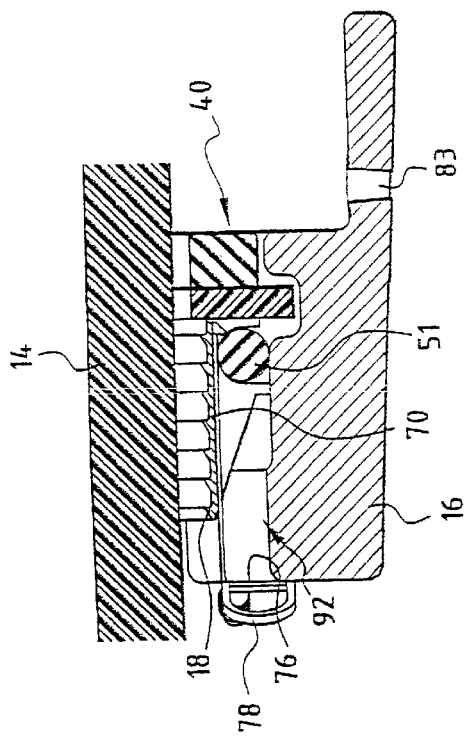
FIG. 6 is a view on a larger scale showing the region of FIG. 5 that includes the spacer.

As shown in FIG. 6, at its periphery and on its inside the ring 16 presents a notch 92 formed in the reentrant rim 32 and within which there extends a portion of the spacer 70 that extends the end of the spacer that is received between the shoulders defined at the ends of the two jaws.

The body 76 and the pull tab 78 project outside the chamber 34, and in particular beyond the clamping ring 16.

While the jaws 50A and 50B are spaced apart, it will be understood that it is easy to engage the pipe 14 into the pipework element 12 since it can go past the gasket without difficulty given that the inside diameter of the gasket is greater than the outside diameter of the pipe 14.

Once the pipe and the pipework element have been properly positioned axially, the spacer 70 is pulled away by pulling on the tab 78. This causes the spacer to escape through the notch 92.

After the spacer 70 has been removed, the two jaws 50A and 50B move automatically towards each other under the action of the elastic band 51. Between them, they then clamp onto the outside surface of the pipe 14. After the two jaws have moved towards each other, the pipe is positioned axially relative to the pipework element.

To provide proper locking of the coupling, the clamping ring 16 is then screwed further onto the pipework element 12 until the complementary cam surfaces 36 and 56A, 56B are brought into contact. When clamping is further continued, the force applied by the cam surface 36 against the complementary surfaces 56A, 56B by the axial displacement of the clamping ring causes centripetal compression to be applied to the two jaws, thereby causing the ribs 54A, 54B to bite part of the way into the outside surface of the pipe 14.

While the ring 16 is being tightened, the ring 40 bearing against the end of the pipework element 12 thrusts the gasket 18 axially towards the cam surface 36, thus ensuring satisfactory co-operation between the contacting cam surfaces.

It will be understood that once the ring 16 has been tightened, with the gasket 18 being held axially by the ring 16 and the gasket being secured around the pipe 14, the pipe 14 is locked axially relative to the pipework element 12.

Finally, in order to avoid the clamping ring 16 becoming accidentally unscrewed, the pin 82 is engaged in the hole 83. Thus, if an attempt at loosening is made, the pin 82 comes into contact with a stud 26 that forms an abutment, thereby preventing the clamping ring from turning.

It will be understood that a coupling as described above makes it simple to connect a pipework element and a smooth pipe end, and to do this with the two elements in an arbitrary axial position relative to each other. The locking gasket 18 does not come to bear against the outside surface of the pipe 14 until the pipe has been properly positioned axially relative to the pipework element 12.

In a variant, the locking ring 16 need not have any thread to enable it to be screwed onto the end of the pipework element. In which case it could have an outwardly-directed flange faced facing a complementary flange associated with the pipework element. Bolts engaged through both flanges would then serve to thrust the clamping ring axially towards the pipework element.

What is claimed is:

1. A coupling for connecting a tubular pipework element with a pipe engaged in said pipework element, the coupling comprising:

a peripheral locking gasket for the pipe, which gasket is adapted to extend around the pipe and is elastically deformable radially from a rest state in which it has a nominal inside diameter;

an outer clamping ring placed on an end of the pipework element and surrounding the peripheral gasket; and axial thrust means for thrusting the clamping ring axially towards the pipework element, the facing surfaces of the clamping ring and of the gasket presenting associated cam surfaces adapted to compress the gasket centripetally onto the pipe when the clamping ring is thrust axially towards the pipework element;

the coupling including spacer means for holding the gasket spaced apart with an inside diameter greater than its nominal diameter prior to the pipe being engaged with said pipework element, which spacer means are releasable once the pipe is engaged;

wherein the gasket has at least one gap in its circumference, and wherein said spacer means include a removable spacer located initially in the gap, which spacer includes a handle extension that is accessible from outside the clamping ring.

2. A coupling according to claim 1, wherein around its circumference the gasket comprises at least two jaws that are curved and rigid, together with elastic return means for thrusting the two jaws centripetally.

3. A coupling according to claim 1, wherein the clamping ring has a notch in its inside surface for passing the handle extension of said spacer.

4. A coupling according to claim 1, wherein, between the locking gasket and the end of the pipework element, the coupling includes resilient trust means for thrusting the gasket axially away from the end of the pipework element.

5. A coupling according to claim 4, wherein the resilient thrust means comprise a washer that is axially expandable, at least in part.

6. A coupling according to claim 5, wherein the clamping ring has an inside groove for receiving the outside edge of said washer.

7. A coupling according to claim 1, wherein the pipework element has an internal peripheral groove and a sealing gasket disposed in the internal peripheral groove.

8. A coupling according to claim 1, wherein the axial thrust means include complementary thread elements formed on the clamping ring and on the pipework element.

9. A coupling according to claim 1, wherein the associated cam surfaces formed on the clamping ring and the gasket are frustoconical surfaces.

10. A coupling according to claim 1, wherein the clamping ring has a radial hole for receiving a pin for locking the clamping ring relative to the tubular pipework element, said hole being formed through the clamping ring so that when the clamping ring is placed on the end of the pipework element and is subjected to thrusting from the axial thrust means, the hole opens out along a locking abutment, formed at the surface of the pipework element, for receiving the pin.

11. A coupling according to claim 1, including a pin connected to said spacer.

12. A method of connecting a tubular pipework element with a pipe engaged in the pipework element, using a coupling comprising:

a peripheral locking gasket for the pipe, which gasket is adapted to extend around the pipe and is elastically deformable radially from a rest state in which it presents a nominal inside diameter that is smaller than the outside diameter of the pipe;

an outer clamping ring placed on an end of the pipework element and surrounding the peripheral gasket; and axial thrust means for thrusting the clamping ring axially towards the pipework element, the facing surfaces of the clamping ring and of the gasket presenting associated cam surfaces adapted to compress the gasket centripetally against the pipe when the clamping ring is thrust axially towards the pipework element;

the coupling including spacer means for holding the gasket spaced apart, wherein the gasket has at least one gap in its circumference, and wherein said spacer means include a removable spacer located initially in the gap, which spacer includes a handle extension that is accessible from outside the clamping ring;

the method comprising the following successive steps:
holding ends of said gasket spaced apart to allow said gasket to have a diameter greater than the outside diameter of the pipe, said gasket being in place axially in the coupling;
inserting the pipe into said gasket;
releasing said spacer so that said gasket by removing said spacer elastically around the pipe; and
thrusting the clamping ring axially towards the pipework element.

* * * * *